US006401053B1

(12) United States Patent
Stefanik

(10) Patent No.: US 6,401,053 B1
(45) Date of Patent: Jun. 4, 2002

(54) MOTION AUTOMATIC DATALINK INTERFACE

(75) Inventor: Michael L. Stefanik, Hilliard, OH (US)

(73) Assignee: Honda of America Mfg., Inc., Marysville, OH (US)

( * ) Notice: Subject to any disclaimer, the term of this patent is extended or adjusted under 35 U.S.C. 154(b) by 70 days.

(21) Appl. No.: 09/670,927

(22) Filed: Sep. 28, 2000

(51) Int. Cl.[7] ............................................... G06F 15/00

(52) U.S. Cl. ...................... 702/150; 702/152; 702/153; 345/475

(58) Field of Search ................................. 702/150, 151, 702/152, 153; 345/156, 158, 473, 474, 475; 340/573.1, 573.3

(56) References Cited

U.S. PATENT DOCUMENTS

| 5,491,495 | A | * | 2/1996 | Ward et al. ................... 345/173 |
| 5,592,401 | A | * | 1/1997 | Kramer ........................ 702/153 |
| 5,790,124 | A | * | 8/1998 | Fischer et al. ............... 345/629 |
| 5,930,741 | A | * | 7/1999 | Kramer ........................ 702/153 |
| 6,050,962 | A | | 4/2000 | Kramer et al. |
| 6,057,859 | A | | 5/2000 | Handelman et al. |

OTHER PUBLICATIONS

Copy of Web Page, Analogus–Motion Capture Suit and Accessories–Products–Gypsy, Http://www.analogus.com/gypsy.html, Root Design, ID8 Media (formerly CadCrafts), 2 pages, 1998.
Copy of Web Page, ID8 Media, Gypsy 2.2—The World's Most Affordable Motion Capture System, http://www.id8media.com/motion/motion_main.htm, 1 page, 1997.
Copy of Web Page, Peak Performance/Biaomechanics/Application/Industrial, http://www.peakperform.com/biochem_apps_industrial.htm, 4 pages, 2000.

* cited by examiner

Primary Examiner—Bryan Bui
(74) Attorney, Agent, or Firm—Rankin, Hill, Porter & Clark LLP

(57) ABSTRACT

A motion automatic datalink interface including a motion capture device, a motion data collection and analysis program and a motion data interlink program. The motion capture device senses movement of a subject and describes the movement as computer-readable data. The motion data collection and analysis program compiles movement data about the human subject. The motion data interlink program provides communication between the motion capture device and the motion data collection and analysis program. A first set of data is received by the motion data interlink program from the motion capture device and transformed into a second set of data that is used by the motion data collection and analysis program.

13 Claims, 2 Drawing Sheets

MOTION AUTOMATIC DATALINK INTERFACE

FIELD OF THE INVENTION

The present invention relates to a computer program for converting human motion data.

BACKGROUND OF THE INVENTION

Industrial and manufacturing engineers often use motion-time studies to assist them improve the efficiency of the manufacturing process and to reduce worker injury and fatigue. These kinds of process studies involve observation of a worker performing a particular job for an extended period of time and recording all of the relevant body movements performed by the worker for each task accomplished. This allows the engineer to analyze the data and determine if the process can be improved.

Much of the motion data collection and analysis process is done using specialized computer programs, such as the MOST system from H.B. Maynard and Co., Inc. Although the process is largely automated by the computer software, the majority of the data utilized is manually collected. This process involves an observer watching a worker for a period of time and manually recording the movements of the worker. This can be costly since it requires one observer for each worker to be studied and its repetitive nature can lead to human error in the data.

Thus, there is a need for an automated method of recording worker movements and providing them in a usable format to a process study software package.

SUMMARY OF THE INVENTION

The present invention solves many of the aforementioned problems of the prior art by providing a motion automatic datalink interface comprising, a motion capture means for sensing movement of a subject and describing the movement as computer-readable data, a motion data collection and analysis means for compiling movement data about the human subject, and a motion data interlink means for providing communication between the motion capture means and the motion data collection and analysis means. A set of data is received by the motion data interlink means from the motion capture means and transformed into a second set of data that is meaningful to the motion data collection and analysis means. Preferably, the motion capture means is a motion capture suit worn by the subject and the motion data collection and analysis means is a manufacturing process study computer program.

The present invention provides a method and device for performing real-time or close to real-time motion studies in an automated manner. Human error is removed as a variable and great quantities of data can be acquired and processed quickly and efficiently. Using the present invention, time-and-motion studies can be greatly expedited and at substantial savings in both time and labor.

The motion data collection and analysis means can interpret and use the collected data for many goals. For example, the collection and analysis means may be a computer application designed to study human movement and repetitive motion disorders or may be used to expedite, on a systems basis, manufacturing operations. The data acquisition, conversion and analysis according to the present invention could be used in many fields, such as manufacturing, service, and sports related industries.

The motion capture means can be additionally provided with a force determining means for sensing or calculating the magnitude of forces applied during movement and stasis of the subject. Alternatively, the weight of objects being moved and the operator's relevant physical dimensions can be input as known values to the program and used to calculate forces and torques experienced during any operation.

DETAILED DESCRIPTION OF THE INVENTION

Figure 1:
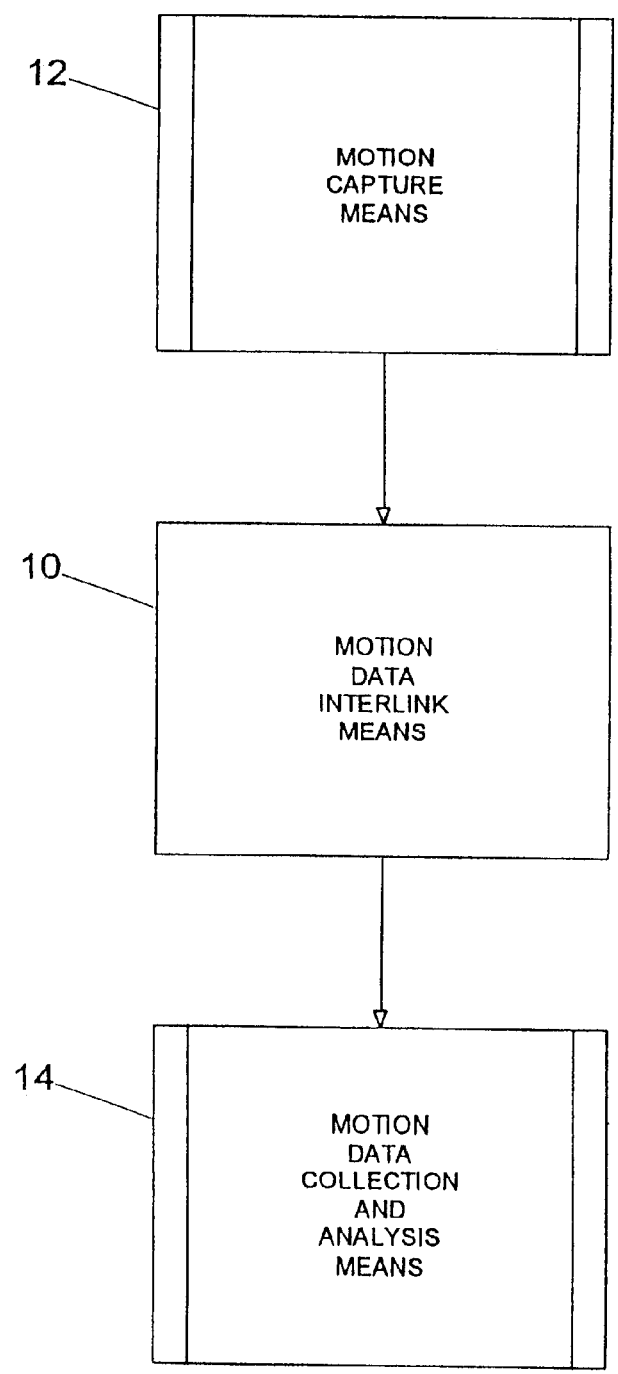
FIG. 1 is a flow diagram of a motion automatic datalink interface of the present invention.

FIG. 1 shows the general data flow of a motion automatic datalink interface of the present invention, including a motion data interlink means 10. A motion capture means 12 may preferably be a suit worn by a worker being studied and is combined with a computer containing at least two software modules, the motion data interlink means 10 and a motion data collection and analysis means 14.

The motion data interlink means 10 accepts data directly from the motion capture means 12 and converts the data into a form that is useable by the motion data collection and analysis means 14. The motion data interlink means 10 sends the converted data to the motion data collection and analysis means 14. The motion data collection and analysis means 14 is preferably a process study software package that collects and analyzes movement data and thereby allows engineers to improve the efficiency and effectiveness of a manufacturing process by studying and manipulating the analyzed output. An example of a process study software package which is depicted in the present embodiment is the MOST package described above. However, it should be appreciated that another suitable software package could be used.

In a software package serving as a motion data collection and analysis means 14, all of the tasks that a worker can perform are divided into specific categories. For example, if the task is tightening a fastener, the necessary steps may include such basic movements such as finger spins, wrist turns, wrist strokes, arm turns and arm strokes. Data is collected by recording the number of each movement performed and the time taken to carry out the task.

The motion capture means 12 provides data output in the form of relative motion of each body member about each joint. This "raw" data is provided to the software serving as the motion data interlink means 10 for conversion into a form used by the software serving as the motion data collection and analysis means 14.

Figure 2:
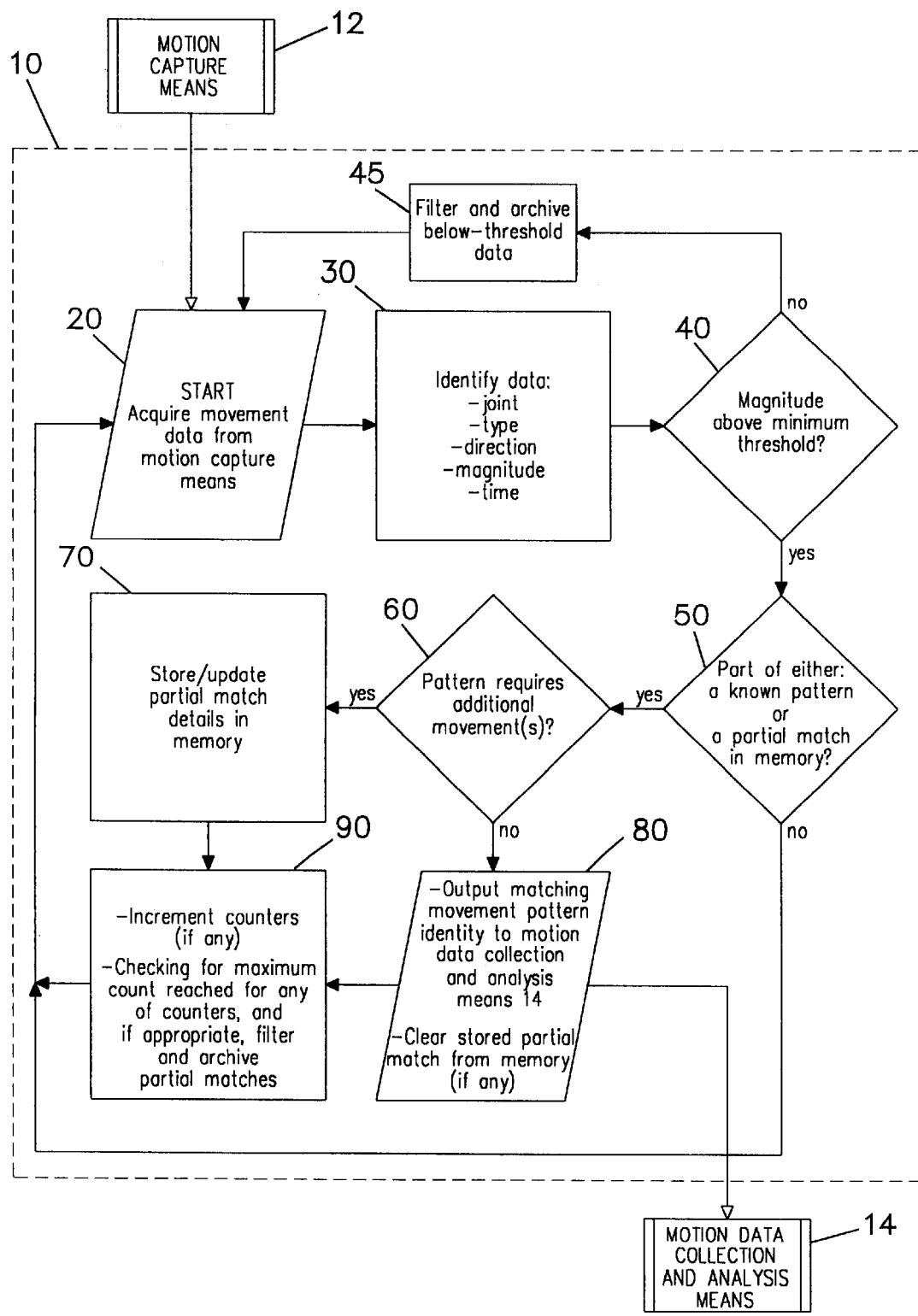
FIG. 2 is a flow diagram of an embodiment of a motion data interlink means of the motion automatic datalink interface of FIG. 1.

FIG. 2 shows the steps of a preferred embodiment of the present invention providing conversion by the motion data interlink means 10 of the raw data from the motion capture means 12 to data in a format useable by the motion data collection and analysis means 14. First, in an acquire data step 20, body movement data is obtained from the motion capture means 12.

The next step (step 30) is to identify the movement 30, wherein the joint involved is identified and the type, the direction, the magnitude of the movement and the time at which the movement occurred is determined from the body movement data. For example, if the moved joint is a wrist, then the type of movement could be a turn (rotation) or a bend (pivot). If the wrist is turned, it is either a clockwise or counter-clockwise movement of a particular angular magnitude. Typically, motion at a joint will be a combination of movements or a compound movement.

It should also be recognized that humans often move their bodies to some degree without intending to accomplish a specific task. These movements are recognized by the motion data interlink means 10 as noise and are filtered out. A particular piece of movement data is determined to be noise if it does not match any of the known movement patterns. For this reason, each movement pattern has a minimum threshold. For example, a wrist rotation of less that 15 degrees will not be considered as part of a wrist turn, and thus a wrist rotation of ten degrees will not trigger a match. If no other movement pattern requires a ten degree wrist rotation, the movement will be filtered out as noise.

To accomplish thus, in a threshold determination step 40, if the acquired movement data is less than a certain predetermined threshold magnitude for the relevant joint and movement type, then the process 10 proceeds to step 45 where the movement data is filtered out as noise and archived for later study. The process is then restarted at the acquire data step 20.

If the movement data is above the threshold level (step 40), then the movement is compared to a list of known movement patterns (step 50). The movement may match a movement pattern exactly, or it may be one element of a compound movement pattern. Movement patterns are defined by a range, i.e. a maximum and minimum magnitude of a particular movement, since no two human movements are identical. A wrist turn, for example, might involve rotation of the wrist by between 25 and 100 degrees.

As stated, if the movement data does not match any of the known patterns, then the data is filtered and archived as noise (step 45) and the process restarts with the step of acquiring data (step 20). However, if there is a match, there are at least three possibilities: the data may match a previously identified compound movement pattern that is still incomplete; the data may be part of a new compound movement pattern; or the data may be a complete simple movement.

When a match of at least part of a movement pattern is found, it must be determined whether the movement pattern is complete (step 60). If the pattern requires no further movements (i.e. the match is a simple movement requiring only one joint movement), the result is output to the motion data collection and analysis means 14 in step 80 and the process proceeds (to step 90).

With reference to step 60, a particular task such as a finger spin could involve a combination of different body movements which can be simultaneous and/or sequential. Such tasks which involve multiple movements will be referred to as compound movements. An example of a compound movement is the wrist turn from the above example. When the worker performs a wrist turn, such as to tighten a screw, the wrist is turned a particular amount and then turned again in the opposite direction. Thus, a wrist turn actually involves two distinct sequential movements. However, the motion data interlink means 10 identifies this sequence of movements as a single compound movement.

Other compound movements, such as a finger spin, may involve simultaneous movements. When the worker performs a finger spin, such as when a nut is threaded onto a bolt, at least two movements are involved. A thumb and a finger each move approximately parallely to the other in opposite directions for some minimum threshold distance. By comparing this data to known movements, the motion data interlink means 10 identifies this movement as a single finger spin.

If the pattern matched in step 50 appears to be part of an incomplete step stored in memory, a time element (i.e. a piece of data specifying when the movement occurred) of the data is compared to time elements of the stored data representing the incomplete step. This it done to assure that the movement occurred in the proper sequence required by the pattern.

In step 60, if there is a correct match and the movement pattern sequence is now complete, the result is output to the motion data collection and analysis means 14 and the completed pattern sequence is cleared from memory in step 80 and the process continues with step 90 to continue processing any other partial movement patterns still stored in memory. Alternatively, if there is a correct pattern match of a compound movement and the pattern is still incomplete as determined by step 60, the data interlink program 10 stores the matched movement in memory (step 70) and proceeds to step 90.

In step 90, a counter assigned to each incomplete match is incremented by a value of one. If the value in any counter exceeds a predetermined maximum, such as five, that match is filtered as noise (i.e. it is presumed that the movement is not part of any known pattern or that the movement is part of an incomplete compound movement that will never be completed). As in step 45, the noise data is archived for later study. In this way, individual movements that are far removed from each other by time and therefore unrelated are not incorrectly pieced together to form a compound movement. Following step 90, the process beings again at step 20 to acquire additional data from the motion capture means 12.

As mentioned above with reference to steps 45 and 90, some movement data acquired from the motion capture means 12 may end up being filtered out as noise. This noise data is, however, useful in studying and analyzing human movements. For this reason, although the data is may not be used by the motion data collection and analysis means, the noise is archived for later study. This noise data may reveal the presence of fatigue, the prevalence of human error in a process, previously unidentified movement patterns, or other useful information. In this way, the present invention provides an additional advantage over traditional methods of manually observing and recording movement data where recording such noise data would not be feasible.

In an alternative embodiment, the motion capture means 12 could be equipped with means for sensing the magnitude of forces applied during movements. This could be utilized by the motion data interlink means 10 to provide more detailed movement information to the motion data collection and analysis means 14.

The embodiment disclosed above is provided by way of example. It should be appreciated that another form of a motion automatic datalink interface according to the present invention could be provided to accomplish the translation of data from the motion capture means 12 to a form suitable for the motion data collection and analysis means 14. It should also be appreciated that another suitable method of automated human movement data acquisition could be utilized as the motion capture means 12 in place of a motion capture suit. For example, video acquisition, using markers on specific body locations, could be used instead of, or as a complement to, a motion capture suit. Other forms of visual, mechanical or magnetic data acquisition are also contemplated. Further, it should be appreciated that another form of the motion data collection and analysis means could be utilized, such as a computer program designed to study human movement for the purpose of injury prevention.

Finally, it is noted that the ranges of motion set forth herein as minimum threshold movements to identify noise data are only provided as examples to further the understanding of the invention and in no way limit the scope of the present invention, which is only defined by the claims appended hereto.

What is claimed is:

1. A motion automatic datalink interface comprising:
   a motion capture means for sensing movement of a subject and describing the sensed movement as computer-readable data;
   a motion data collection and analysis means for compiling movement data about the subject; and
   a motion data interlink means for providing communication between the motion capture means and the motion data collection and analysis means, wherein a first set of data received by the motion data interlink means from the motion capture means is transformed into a second set of data, said second set of data being provided to the motion data collection and analysis means and being used by the motion data collection and analysis means to provide information regarding the sensed movement of the subject.

2. The motion automatic datalink interface of claim 1, wherein the motion capture means is a motion capture suit worn by the subject.

3. The motion automatic datalink interface of claim 1, wherein the motion data collection and analysis means is a manufacturing process study computer program.

4. The motion automatic datalink interface of claim 1, wherein the motion data collection and analysis means is a computer program designed to study human movement.

5. The motion automatic datalink interface of claim 1, wherein the motion capture means is provided with a force determining means for sensing a magnitude of forces applied during movement and stasis of the subject.

6. The motion automatic datalink interface of claim 1, further comprising a noise filtering means for identifying components of said first set of data as noise data and preventing the noise data from being transformed into the second set of data by the motion data interlink means.

7. The motion automatic datalink interface of claim 6, further comprising a noise archival means for storing the noise data for later study.

8. A method of automatically acquiring and providing movement data to a motion data collection and analysis means, comprising the steps of:
   sensing movement of a human subject and describing the sensed movement as a first set of computer-readable movement data;
   transforming said first set of data into a second set of data, said second set of data being usable by the motion data collection and analysis means; and
   providing said second set of data to the motion data collection and analysis means.

9. The method of automatically acquiring and analyzing movement according to claim 8, further comprising a step of filtering out noise components of the first set of data before said first set of data is transformed into the second set of data.

10. The method of automatically acquiring and analyzing movement according to claim 9, wherein the noise components are identified according to a predetermined minimum threshold level.

11. The method of automatically acquiring and analyzing movement according to claim 9, wherein the noise components are identified as being incomplete portions of known compound movements.

12. The method of automatically acquiring and analyzing movement according to claim 9, wherein the noise components are identified as being unknown movements.

13. The method of automatically acquiring and analyzing movement according to claim 9, further comprising a step of archiving the noise components for later study.

* * * * *